Oct. 19 1948.  A. A. AINSWORTH  2,451,646
PICTURE CORNER MOUNT
Filed March 1, 1943  4 Sheets-Sheet 1

Inventor
A. A. AINSWORTH,
By Munson H. Lane
Attorney

Oct. 19 1948.　　　A. A. AINSWORTH　　　2,451,646
PICTURE CORNER MOUNT
Filed March 1, 1943　　　　　　　　　　　　4 Sheets-Sheet 2
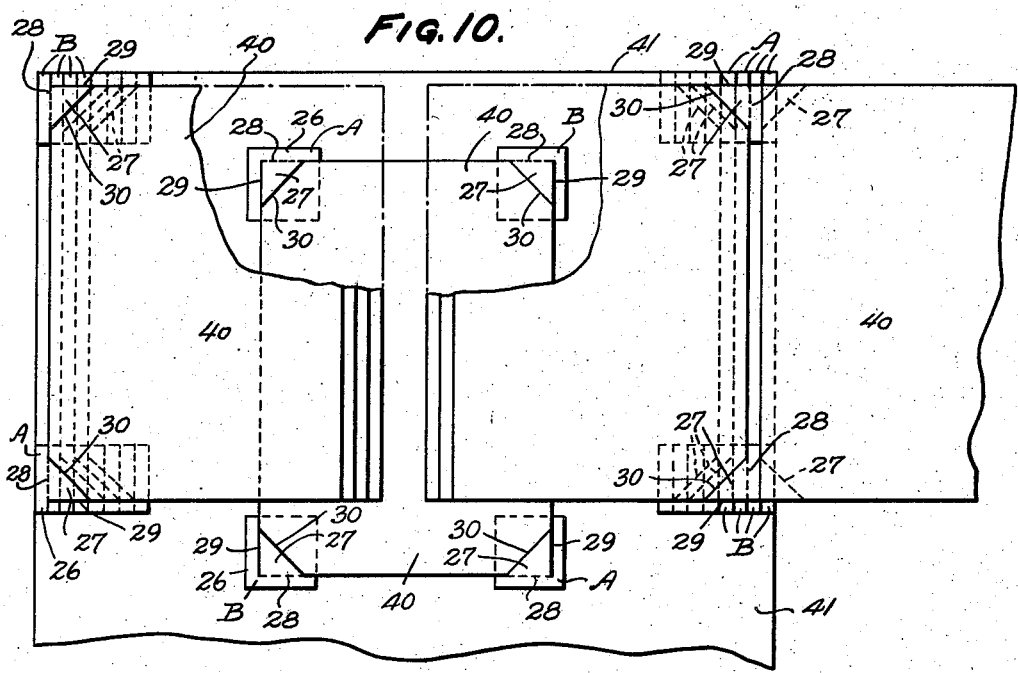
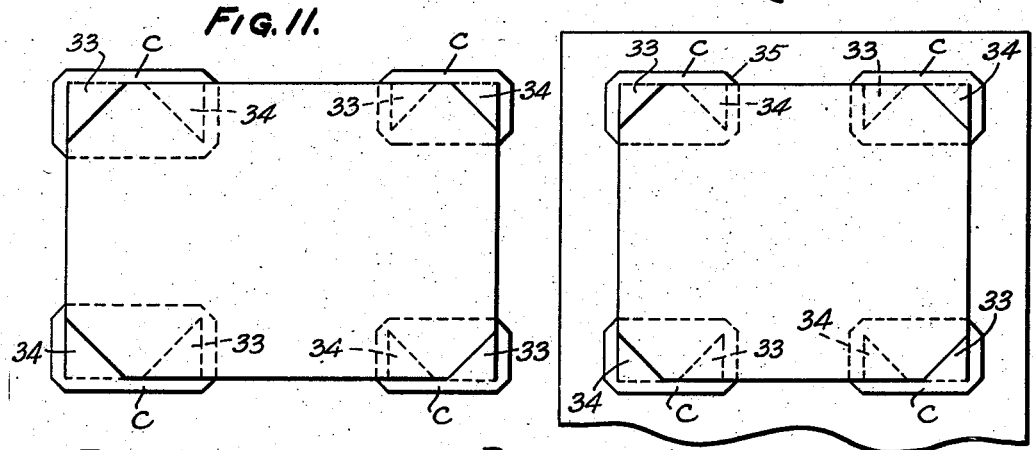
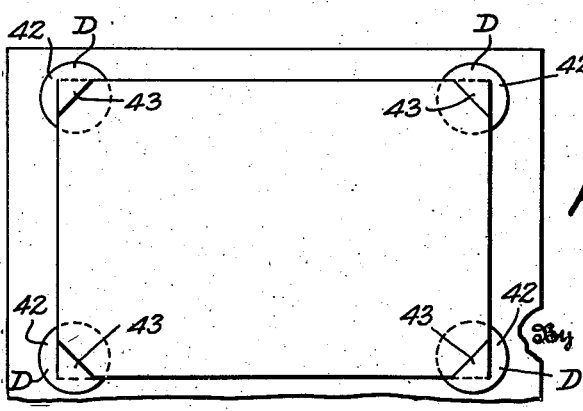
Inventor
A. A. Ainsworth,
Munson H. Lane
Attorney Oct. 19 1948.  A. A. AINSWORTH  2,451,646
PICTURE CORNER MOUNT
Filed March 1, 1943  4 Sheets-Sheet 3

Inventor
A. A. AINSWORTH,
By Minsow H. Lane
Attorney

Oct. 19 1948.  A. A. AINSWORTH  2,451,646
PICTURE CORNER MOUNT
Filed March 1, 1943  4 Sheets-Sheet 4
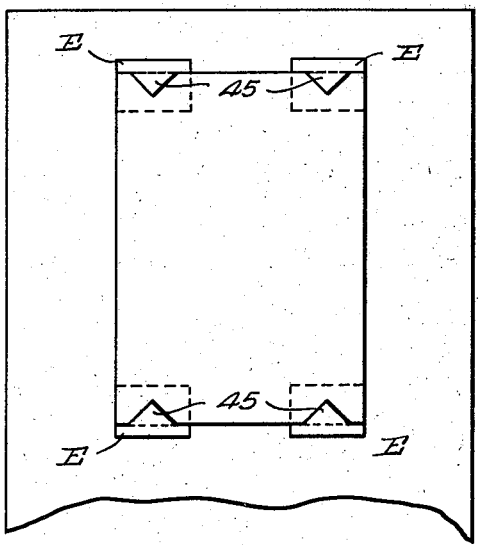
FIG. 20.
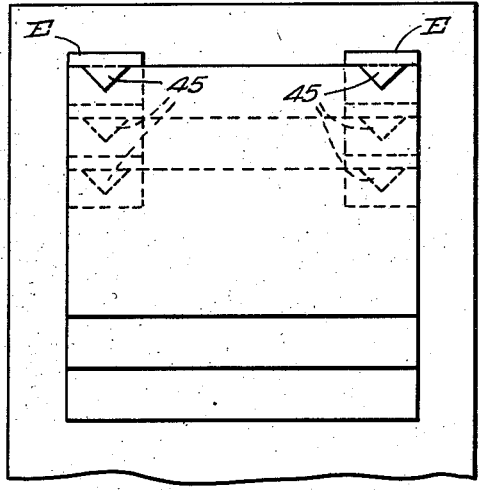
FIG. 21.
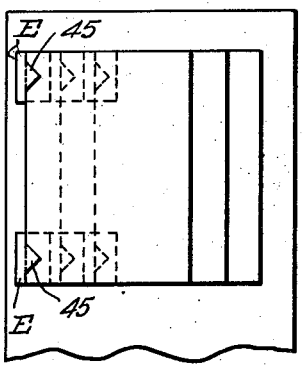
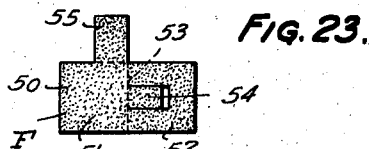
FIG. 23.
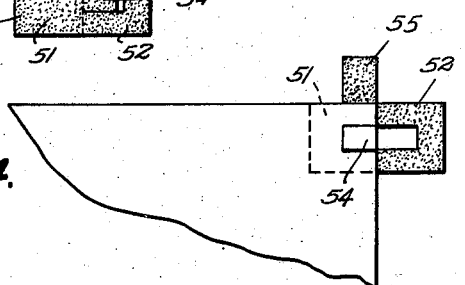
FIG. 22.  FIG. 24.
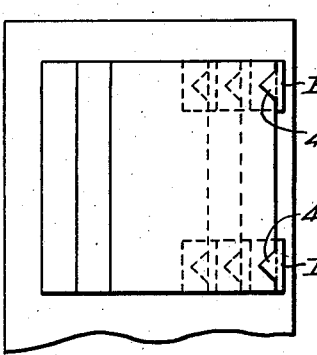
FIG. 22a.
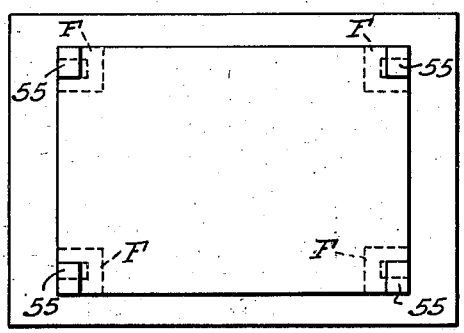
FIG. 25.
Inventor
A. A. AINSWORTH,
By Munson H. Lane
Attorney Patented Oct. 19, 1948

2,451,646

UNITED STATES PATENT OFFICE 2,451,646

PICTURE CORNER MOUNT

Albert A. Ainsworth, Savannah, Ga.; Clara Ayles Ainsworth, executrix of said Albert A. Ainsworth, deceased, assignor to Clara Ayles Ainsworth, Savannah, Ga.

Application March 1, 1943, Serial No. 477,605

1 Claim. (Cl. 40—158)

The invention relates to corner mounts, tabs or the like, designed for securely mounting cards, photoprints, etc., upon a comparatively stiff backing.

Corner mounts are known in which the mounts are secured to a backing and the prints are releasably mounted within the corner mounts. Thus the corner mounts now in general use, such as are shown for example in Patents Nos. 1,326,139; 1,355,694 and 1,742,615, do not securely fasten the prints to the backing, and when prints or cards so mounted curl or warp, as all prints do, they tend to pull out of the corner pockets and to become detached from the backing.

According to my invention corner mounts are adapted to be adhesively secured to a backing and are provided with integral, triangular gummed tongue or hinge members by means of which the cards or prints are securely anchored in place, thus preventing loss of such cards or prints.

Among the general objects of my invention are to insure economy in manufacture of the corner mounts and to insure a firm and automatic anchorage of cards, photoprints or the like mounted therein to its backing. Another feature of the invention is the adaptability of the corner mounts to various uses.

The corner mounts are preferably furnished in pairs which include a right and left hand corner mount, from which pairs individual corner mounts may be separated when ready for use, if desired, or the combined right and left hand members may be used together as a unit.

The invention will be more readily understood by reference to the accompanying drawings, in which various modifications of the inventive thought are set forth by way of illustration and not by way of limitation.

In the drawings—

Fig. 1 denotes one form of a left hand corner mount;

Fig. 2 denotes the corresponding right hand corner mount;

Fig. 3 denotes a pair of right and left hand corner mounts secured together but adapted to be separated into individual units;

Fig. 4 denotes a combined right and left hand corner mount of slightly modified form, the combined corner mount being adapted for right or left hand application, as desired;

Fig. 10 is a view showing cards attached to a backing by means of the right and left hand corner mounts shown in Figs. 1 and 2, the card at the center being fixedly secured and the cards at the sides being hingedly secured in overlapping order;

Fig. 11 is a view illustrating the mounting of a card with a plurality of the combined corner mounts such as are shown in Fig. 4;

Fig. 12 shows the mounting of a card upon a backing with a set of four corner mounts;

Fig. 13 shows a card or print mounted with the use of a set of four of the combined right and left hand corner mounts of the type shown in Fig. 4;

Figs. 18, 19 and 20 are views showing the use of a modified corner mount for securing a print or card to a backing, the mounts being attached to the cards in different ways in the three different figures;

Fig. 21 shows the use of the same type of corner mount used for hingedly attaching cards in overlapped order;

Figs. 22 and 22a are similar views showing the cards hinged about a vertical instead of a horizontal axis;

Fig. 23 discloses a still further modified form of corner mount;

Fig. 24 shows a mode of attaching the corner mount to a card, and

Fig. 25 shows the use of a set of four of such corner mounts to permanently mount a card to a back.

In corners of my invention each of the corner mounts or tabs comprises a body portion of comparatively strong flexible material, such as paper or cloth, having a certain degree of stiffness, which body portion is adapted to be adhesively secured to a relatively stiff backing member. Each corner mount is provided with one or more tongues integral with the body member by means of which a card, print or the like is adapted to be firmly secured to the backing. Various types of corner mounts are disclosed herein, together with various methods of mounting the same upon a back using various methods of securing the tongues to a card and various methods of economically producing the corner mounts from strip or sheet material.

Figure 1:
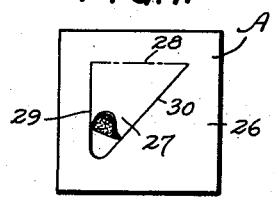

Referring first to Fig. 1, the corner mount A comprises a body member 26 preferably gummed on its rear surface and ungummed on the opposite surface. The body member is provided with a triangular tongue 27 hinged thereto along the hinge line 28 parallel to one side of the body member. The tongue is shown as cut away from the body portion along lines 29 and 30, the line 29 being perpendicular to the hinge line 28 and parallel to one side of the mount. The line 30 is diagonal and connects the remote end of the line 29 to the end of the hinge line 28. The tongue as shown is in the form of an isosceles triangle. The tongue is preferably gummed on the rear surface to permit attachment to a card or print.

Figure 2:
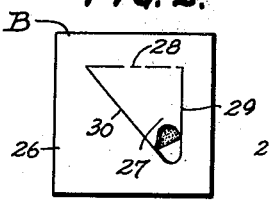

Fig. 2 shows a corner mount B similar to the one shown in Fig. 1, but constituting a right hand corner mount whereas the corner mount A shown in Fig. 1 is a left hand corner mount. The corner mounts A and B are adapted to be used in right and left pairs as illustrated, for example, in Fig. 10.

Figure 3:
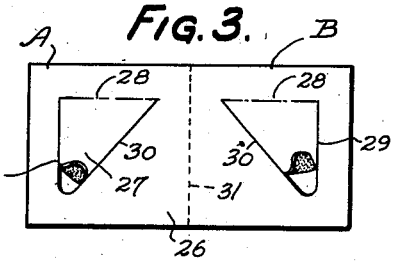

The corner mounts may be furnished to a user in couples or uncut pairs with a connecting line 31 perforated, if desired, to facilitate separation. Such a pair is shown in Fig. 3 for example.

Figure 4:
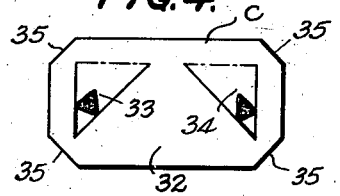

If desired the couples or united pairs may be in the form shown in Fig. 4, such couples C being cut from a single sheet. Each couple or combined member 32 includes oppositely disposed right and left triangular tongues 33 and 34, and each couple or pair is provided with beveled corners 35.

Figure 5:
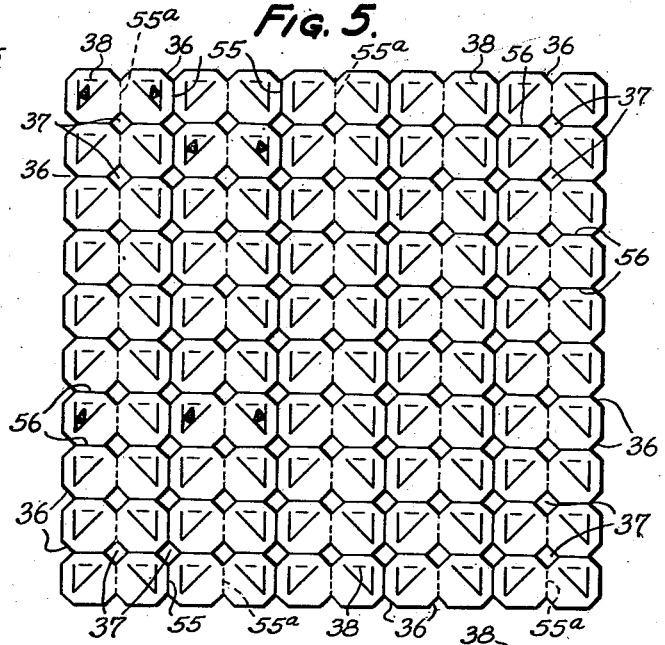
Fig. 5 is a view showing a sheet from which a plurality of the combined corner mounts may be cut, or from which individual corner mounts may be formed.
Figure 6:
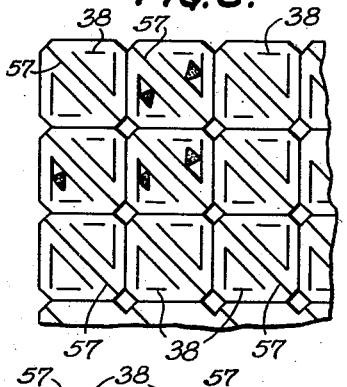
Figs. 6, 7, 8 and 9 are views similar to Fig. 5 but showing modifications of the sheet from which different forms of combined or individual corner mounts may be cut.
Figures 7, 9:
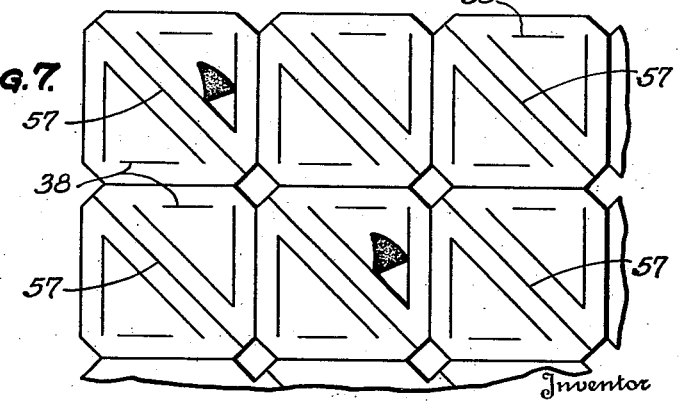
Figure 8:
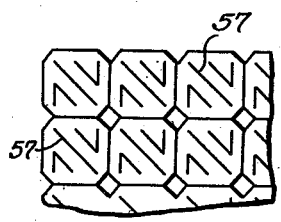

Fig. 5 illustrates an economical method of forming corner mounts, either in couples or in individual units, from a single sheet of material. The sheet is formed with spaced notches 36 along its outer edges, and with diamond shaped cut out portions 37 arranged in vertical and horizontal alignment with the notches 36. A short slot 38 may be provided for each tongue to facilitate bending the same. This slot performs the same function as the hinge line 28 in the form of mount shown in Fig. 1.

It will be noted that full and dotted vertical lines 55 and 55a, and horizontal lines 56 are provided connecting the notches in diamond shaped cut out portions. These lines are to facilitate cutting the mounts from the sheet either in connected pairs or in right and left units, depending on whether the mounts are cut along alternate vertical lines or along each vertical line.

Figs. 6 to 9 inclusive show modified forms of mounting pairs or mounting units. In these modifications the cuts will be made along vertical and horizontal lines to form combined pairs, and may also be cut along the diagonal lines 57 connecting the diamond shaped cut out portions to separate combined pairs into individual units.

At the center of Fig. 10 a card 40 is shown secured to a suitable backing 41 by the use of four corner mounts of the right and left hand type shown in Figs. 1 and 2. At the right and left of the figure the cards or prints are shown hingedly connected to the backing by the use of a pair of corner mounts secured along one side or edge only of the card or cards and are arranged in overlapping order. It will be noted that the lines 28 and 29 being parallel to the respective sides of the body portion of the corner mount provide effective guides for accurately mounting the corner of the card. When two or four mounts are employed in connection with the card the diagonal lines 30 present a neat and attractive appearance and the tongues cover a minimum space on the outer face of the card assembled therewith.

Fig. 11 shows the use of four combined mounts or pairs of the type shown in Fig. 4 secured to a card. This entire assembly is shown secured to a backing in Fig. 13.

Fig. 12 shows a card secured to a backing with the use of four corner mounts D of a type in which the body portion 42 of each mount is circular and is provided with a triangular tongue 43 similar to the tongue 27 shown in Fig. 1.

Figure 14:
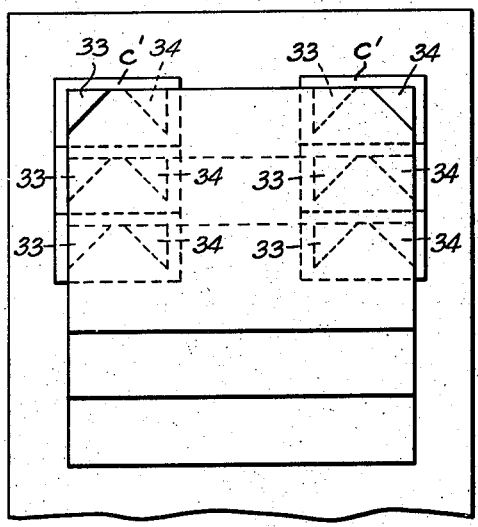
Fig. 14 shows the mounting of cards or prints in overlapped order, each using a set of two combined right and left hand corner mounts.

Fig. 14 shows a plurality of cards mounted on a backing in overlapping order using combined right and left mounts C' similar to what is shown in Fig. 4 except that the corners of the mounts are not beveled as in the construction shown in Fig. 4.

Figure 15:
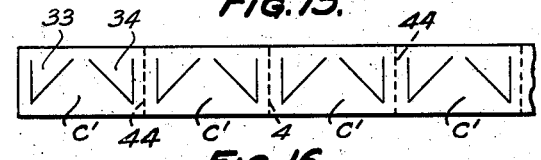
Fig. 15 is a view showing a strip of similar corner mounts.
Figure 16:
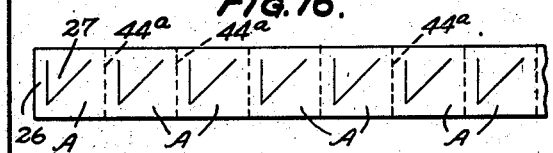
Fig. 16 is a view showing a strip of single corner mounts.
Figure 16A:
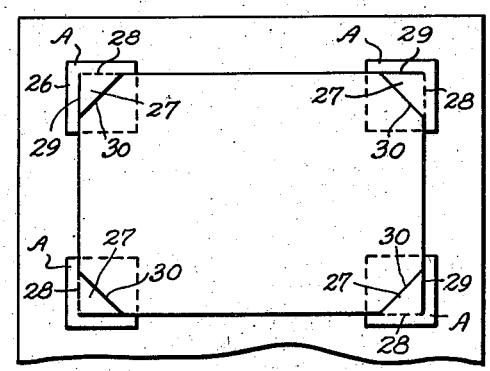
Fig. 16a illustrates the mounting of a card with a plurality of corner mounts, one at each corner of the card.
Figure 17:
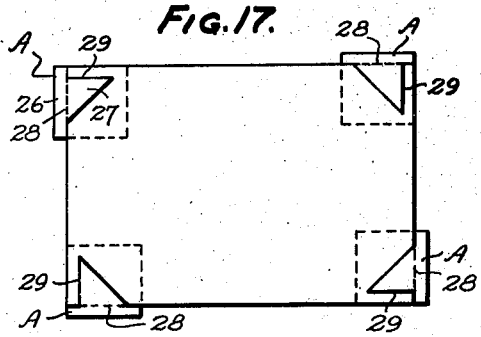
Fig. 17 shows various ways in which the corner mounts may be attached to a card.

The corner mounts may also be supplied in strips comprising a plurality of individual pairs C' each of which may be readily separated from the others along lines 44 as illustrated in Fig. 15. A similar arrangement is shown in Fig. 16 except that these corner mounts are not formed in pairs but are individual units A separated by lines 44a, and may be applied to a card by turning the corner mounts so that the straight cut side 29 of each tongue is flush with the adjacent side of the card as illustrated, for example, in Fig. 16a, wherein a plurality of the individual elements shown in Fig. 16 are shown applied in the mounting of a card upon a backing. Another method of securing corner mounts A of the type shown in Fig. 16 to a card is illustrated in Fig. 17, wherein the side 29 of each tongue is spaced from but parallel to the adjacent edge of the card. These various embodiments of the invention will serve to demonstrate the flexibility of the corner mounts.

Figure 18:
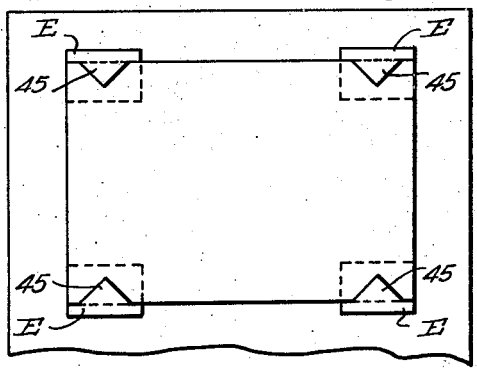
Figure 19:
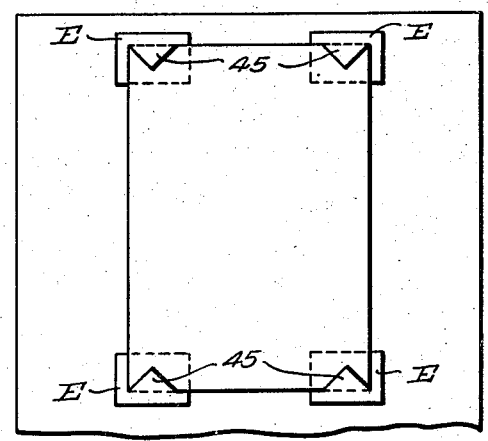

Another form of corner mount E is shown in Figs. 18 to 22a, inclusive. In these figures the corner mounts are provided with V-shaped tongues 45 which are symmetrically located with reference to the body portion of the mount. In Fig. 18 four corner mounts are employed for mounting a card longitudinally. Only one edge of the corner and the V-shaped tongue is visible when the card is mounted. In Fig. 19 similar corner mounts are employed, but the arrangement is such that two edges of each corner mounted are visible in the completed construction. Fig. 20 is similar to Fig. 18 excepting that the card is mounted vertically instead of horizontally.

In Figs. 21, 22 and 22a the cards are mounted in overlapping order, using two mounts for each card. In Fig. 21 the cards swing about a horizontal axis; in Fig. 22 the cards are mounted to swing about vertical axes at the left of each card, and in Fig. 22a the mounts are attached at the right of each card.

A very compact arrangement may be provided by permanently mounting a single card directly to the backing as in Fig. 20 and arranging other cards in swinging and overlapping order, as in Figs. 21, 22 and 22a, to overlie the originally applied card, and if desired to overlap one another in an arrangement similar to that shown in Fig. 10.

In Fig. 23 a somewhat different form of corner mount is disclosed. In this the body portion 50 is divided into two halves 51 and 52 along line 53. As shown, a tongue 54 is cut out of the portion 52 and another tongue member 55 extends from one edge of the body portion 50 in a direction at right angles to the tongue 54. One side of the body portion including the tongue members is preferably coated with adhesive material, while the other face is uncoated.

The mount shown in Fig. 23 may be applied to a card in the manner illustrated in Fig. 24. The adhesive surface of the body portion 51 is secured to the back of the card at one corner thereof and the tongue 54 is folded over the front face of the card and adhesively secured thereto. The gummed tongue 55 is then folded down over the front face of the card and over the tongue 54 and adhesively secured thereto. The body portion 52 of the card is adhesively secured to the backing. It will be understood that in use the attachment of the body portion 52 to the backing is generally the first step, the card being secured to the mounting after the mounting has been applied to the backing. This arrangement provides a space between the mounted card and the backing and also provides very good anchorage. The use of a plurality of such mounting tabs, one at each of the four corners of a card applied to a backing is shown in Fig. 25.

The invention has been described in detail for the purpose of illustration, but it will be obvious that numerous modifications and variations may be resorted to without departing from the spirit of the invention.

I claim:

A combined right and left corner mount including a body portion and a pair of tongues formed integral therewith, said tongues being in the form of right angle triangles, each connected to the body portion along a line parallel one edge of the combined mount and being cut away from the body portion along lines respectively perpendicular and diagonal to the hinge line, and the diagonal lines of the two tongues being oppositely directed so as to form right and left corners.

ALBERT A. AINSWORTH.

REFERENCES CITED

The following references are of record in the file of this patent:

UNITED STATES PATENTS

| Number | Name | Date |
| --- | --- | --- |
| 952,642 | Robertson | Mar. 22, 1910 |
| 1,351,560 | Engel | Aug. 31, 1920 |
| 1,604,028 | Dinkler | Oct. 19, 1926 |

FOREIGN PATENTS

| Number | Country | Date |
| --- | --- | --- |
| 170,384 | Great Britain | Oct. 17, 1921 |
| 412,352 | Great Britain | June 28, 1934 |
| 572,770 | Germany | Mar. 23, 1923 |